(No Model.)
A. E. COLGATE.
METHOD OF PROTECTING THE LEAD PIPE OF TELEGRAPH CABLES FROM CORROSION.
No. 403,418. Patented May 14, 1889.
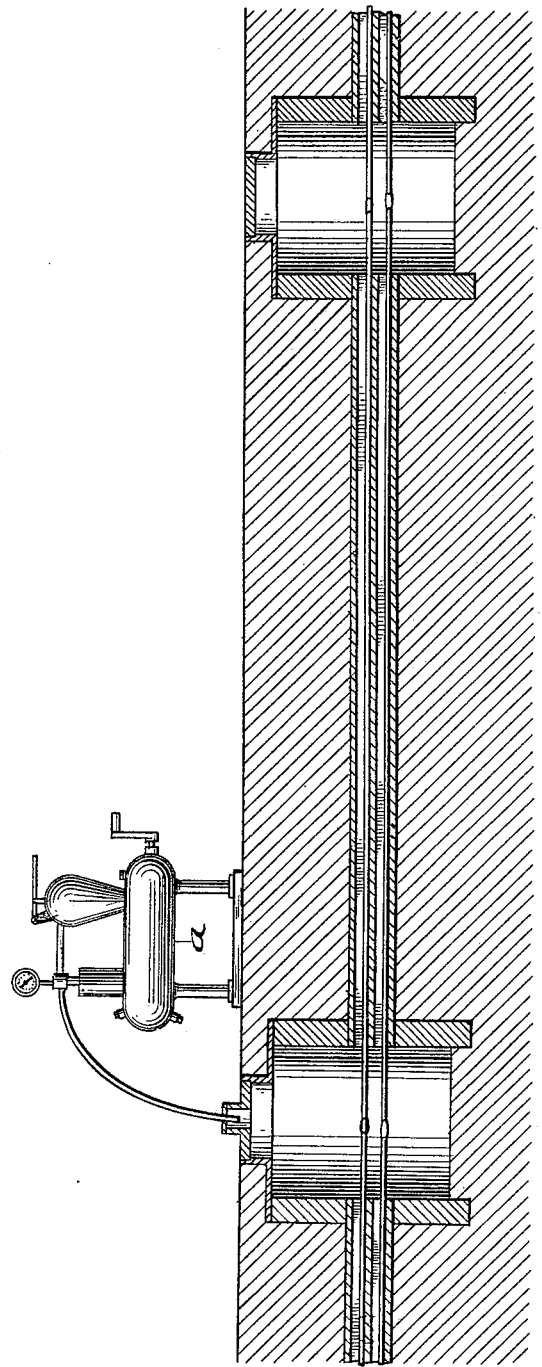
Witnesses:
Chas. G. Hawley.
Inventor:
Arthur E. Colgate
By George P. Barton
Attorney.

UNITED STATES PATENT OFFICE.

ARTHUR E. COLGATE, OF NEW YORK, N. Y., ASSIGNOR TO THE WESTERN ELECTRIC COMPANY, OF CHICAGO, ILLINOIS.

METHOD OF PROTECTING THE LEAD PIPE OF TELEGRAPH-CABLES FROM CORROSION.

SPECIFICATION forming part of Letters Patent No. 403,418, dated May 14, 1889.

Application filed February 2, 1889. Serial No. 298,445. (No model.)

*To all whom it may concern:*

Be it known that I, ARTHUR E. COLGATE, a citizen of the United States, residing at New York city, in the county of New York and State of New York, have invented a certain new and useful Improvement in Method of Protecting the Lead Pipe of Telegraph-Cables from Corrosion, (Case 1,) of which the following is a full, clear, concise, and exact description, reference being had to the accompanying drawing, forming a part of this specification.

My invention relates to protecting the lead pipe of telegraph-cables, when laid in underground conduits, from corrosion.

Heretofore the conduits have been treated with sulphuric acid and other compounds for the purpose of destroying acetic acid or other harmful substances that might be present.

I have found that a coating which cannot be penetrated or dissolved by moisture may be formed upon the lead pipe after the cables are laid in place by forcing into the conduits about the pipes sulphureted hydrogen. This acting upon the lead forms a covering of lead sulphide, and it is in this, speaking generally, that my invention consists.

My invention may be carried out in various ways, and I therefore do not limit myself to any particular apparatus for generating the sulphureted hydrogen and forcing the same into the conduits. I have, however, shown in the drawing accompanying this specification an apparatus which may be used for this purpose. This generator $a$ is connected, preferably, with one of the man-holes of the subway, as shown. The sulphureted hydrogen produced by the generator is forced into the conduit about the cables, and unites with the same to form a coating of sulphide. This sulphide I have found is an adequate protection to the lead pipe.

Having thus described my invention, I claim as new and desire to secure by Letters Patent—

The method of forming a coating of sulphide upon lead pipes, which consists in forcing sulphureted hydrogen into the conduit containing the lead-covered cables, substantially as and for the purpose specified.

In witness whereof I hereunto subscribe my name this 31st day of December, A. D. 1888.

ARTHUR E. COLGATE.

Witnesses:
JOSEPH B. BRAMAN,
CHARLES P. HOWE.